US012679070B2

(12) United States Patent
Christopherson et al.

(10) Patent No.: US 12,679,070 B2
(45) Date of Patent: Jul. 14, 2026

(54) MULTILAYER STRUCTURE FOR A BATTERY ENCASEMENT

(71) Applicant: AMCOR FLEXIBLES KREUZLINGEN AG, Kreuzlingen (CH)

(72) Inventors: Roy Christopherson, Wiltshire (GB); Peter Ettridge, Worcestershire (GB); Wolfgang Lohwasser, Gallingen (DE); Galina Ourieva, Amougies (BE)

(73) Assignee: Amcor Flexibles Kreuzlingen AG (CH)

( * ) Notice: Subject to any disclaimer, the term of this patent is extended or adjusted under 35 U.S.C. 154(b) by 621 days.

(21) Appl. No.: 17/919,480

(22) PCT Filed: May 5, 2021

(86) PCT No.: PCT/US2021/030764
§ 371 (c)(1),
(2) Date: Oct. 17, 2022

(87) PCT Pub. No.: WO2021/226160
PCT Pub. Date: Nov. 11, 2021

(65) Prior Publication Data
US 2023/0173792 A1     Jun. 8, 2023

(30) Foreign Application Priority Data

May 6, 2020     (EP) ..................................... 20173300

(51) Int. Cl.
B32B 15/085     (2006.01)
B32B 7/12     (2006.01)
(Continued)

(52) U.S. Cl.
CPC .............. B32B 15/085 (2013.01); B32B 7/12 (2013.01); B32B 27/08 (2013.01); B32B 27/34 (2013.01);
(Continued)

(58) Field of Classification Search
CPC ............. H01M 50/129; B32B 2457/10; B32B 15/085; B32B 7/12; B32B 27/08;
(Continued)

(56) References Cited

FOREIGN PATENT DOCUMENTS

| CN | 1491443 A | 4/2004 |
| CN | 101495305 A | 7/2009 |

(Continued)

OTHER PUBLICATIONS

English machine translation of KR 2016-0134636, Korea, Nov. 23, 2016.*

(Continued)

*Primary Examiner* — Holly Rickman
(74) *Attorney, Agent, or Firm* — Greg N. Geiser

(57) ABSTRACT

The present invention is related to a battery module packaging comprising a multilayer structure 1, said structure comprising an inner polymer layer 2, an outer polymer layer 4 and an aluminum foil 5 sandwiched between the inner polymer layer 2 and the outer polymer layer 4, or an inner polymer layer 2, an outer polymer layer 4, an aluminum foil 5 sandwiched between the inner polymer layer 2 and the outer polymer layer 4 and an intermediary layer 3 sandwiched between aluminum foil 5 and inner polymer layer 2. In use, the inner polymer layer 2 is in direct contact with the cell part of the battery and the outer polymer layer 4 is in contact with a hardware element of the battery.

16 Claims, 2 Drawing Sheets

(51) Int. Cl.
| | |
|---|---|
| *B32B 27/08* | (2006.01) |
| *B32B 27/34* | (2006.01) |
| *B32B 27/36* | (2006.01) |
| *B32B 37/12* | (2006.01) |
| *H01M 50/129* | (2021.01) |

(52) U.S. Cl.
  CPC .............. *B32B 27/36* (2013.01); *B32B 37/12*
        (2013.01); *H01M 50/129* (2021.01); *B32B
        2250/05* (2013.01); *B32B 2255/06* (2013.01);
          *B32B 2255/10* (2013.01); *B32B 2255/205*
          (2013.01); *B32B 2311/24* (2013.01); *B32B
                      2457/10* (2013.01)

(58) Field of Classification Search
  CPC ......... B32B 27/35; B32B 27/36; B32B 37/12;
          B32B 2250/05; B32B 2250/06; B32B
          2311/24; B32B 2255/205; B32B 2255/10
  See application file for complete search history.

(56) References Cited

FOREIGN PATENT DOCUMENTS

| | | | | |
|---|---|---|---|---|
| EP | 1359631 | A1 * | 11/2003 | ............. B32B 15/08 |
| JP | 2013149558 | A | 8/2013 | |
| KR | 1020130118867 | A | 10/2013 | |

OTHER PUBLICATIONS

PCT International Search Report, International Application No. PCT/US2021/030764, issued Jun. 11, 2021, 4 pages.

* cited by examiner

MULTILAYER STRUCTURE FOR A BATTERY ENCASEMENT

FIELD OF THE INVENTION

The present invention is related to a flexible multilayer structure for battery encasement, in particular for lithium battery encasement.

Batteries with various types of chemistries are typically sold in rigid, hermetically-sealed containers that at the simplest level must contain the electrolyte while keeping out the exterior atmosphere. Most conventional battery cases for containing the component elements of a battery are metal cases. However such rigid containers can have limitations in packaging situations where the form of the battery is important. Another limitation may be in weight and assembly cost.

Electric vehicles, hybrid electric vehicles, and various electronic apparatuses including notebook computers and portable telephone sets have been developed and efforts have been made in recent years to reduce the weight, the stiffness and the dimensions of the batteries.

Flexible packaging, consisting of a base layer, a barrier layer and a heat-sealable layer, provides an alternative to the rigid container.

However, flexible packaging for batteries does not come without concerns. One of the main concerns is the barrier performance towards electrolyte solvent, moisture and air and the resistance to hydrogen fluoride; moreover, the multilayer laminate must be heat sealable with a high level of seal strength.

Flexible multilayer laminates for battery encasement are subject of a multiple of technical and patent literature.

EP 1 884 353 A1 discloses a multilayer film comprising a plastic base foil, a metal foil and a functional plastic layer. A metallic chromium layer with thickness of 0.1 to 1000 nanometers is arranged on the metal foil layer in the direction of the functional plastic layer or on the functional plastic layer through a physical deposition process, such as vapor deposition processes or sputtering.

EP 1 209 094 A1 discloses a polymer battery module packaging laminated structure including a base layer, a first adhesive resin layer, a first chemically converted layer, an aluminum layer, a second chemically converted layer, a second adhesive resin layer, a heat-sealable layer and a liquid-paraffin layer.

EP 1 102 336 A1 discloses a lithium battery comprising a pouch and a lithium battery module packaged in the pouch. The pouch is formed from a laminated structure having an outermost layer, a barrier layer, and an innermost layer, or an outermost layer, a barrier layer, an intermediate layer and an innermost layer superposed in that order.

EP 1 359 631 A1 discloses a laminate for battery encasement comprising aluminum foil and an inner layer, wherein a resin film layer that comprises an aminated phenol polymer, a trivalent chromium compound, and a phosphorus compound lies between the aluminum foil and the inner layer.

EP 1 422 767 A1 discloses a laminate for battery encasement comprising aluminum foil and an inner layer, wherein a resin film layer that comprises an aminated phenol polymer, an acrylic polymer, a phosphorus compound, and a zirconium compound lies between the aluminum foil and the inner layer.

EP 0 975 031 A1 discloses a battery case formed by processing a laminated sheet, said laminated sheet being formed by laminating a first base film layer, i.e. an outermost layer, a metal foil layer, and a heat-adhesive resin layer. The first base film layer is a biaxially oriented polyethylene terephthalate resin film or a biaxially oriented nylon resin film. The metal foil layer is an aluminum or copper foil. The heat-adhesive resin layer is formed of a polyolefin resin, more preferably, of an acid-denatured polyolefin resin.

DE 10 2010 004828 A1 discloses a high capacity battery, having a plurality of electrical battery packs, each having a battery which is enclosed by a battery enclosure, wherein the battery enclosure of at least one battery pack comprises a laminate film having a metal film, a base film made of plastic arranged on the side of the metal film facing away from the battery, at least one protective layer applied to the metal film on the side of the metal film facing the battery, a plastic inner layer, an adhesion layer arranged between the protective layer and the inner layer, wherein the adhesion layer comprises or is a duroplast adhesive layer.

EP 1 160 892 A1 discloses a polymer battery module packaging sheet including a base layer, an aluminum layer, chemical conversion coatings coating the opposite surfaces of the aluminum layer, and an innermost layer. The chemical conversion coatings are formed by processing the opposite surfaces of the aluminum layer by a phosphate treatment method.

Without contesting the associated advantages of the prior-art multilayer laminates, they all suffer from one or more shortcomings when a combination of properties such as excellent gas barrier properties, excellent adhesiveness to the electrodes, heat resistance and cold resistance, resistance to the electrolyte, resistance to corrosion by hydrofluoric acid and ease of production and shaping is considered.

It is therefore obvious that there is still a need for a multilayer film that does not show any of the existing known drawbacks and/or shortcomings and that is obtained from an economical and environmentally friendly process.

Aim of the Invention

The present invention aims to provide a multilayer film that does not present the drawbacks of the prior art.

It thus is the aim of the present invention to provide a multilayer film for the encasement of battery modules, in particular of lithium battery modules, with a combination of excellent gas and water barrier properties, excellent adhesiveness to the electrodes, heat and cold resistance, resistance to the electrolyte, resistance to corrosion by hydrofluoric acid and ease of production and shaping.

SUMMARY OF THE INVENTION

The present invention discloses a battery module packaging comprising a multilayer structure 1, said structure comprising:

- an inner polymer layer 2, an outer polymer layer 4 and an aluminum foil 5 sandwiched between the inner polymer layer 2 and the outer polymer layer 4, or
- an inner polymer layer 2, an outer polymer layer 4, an aluminum foil 5 sandwiched between the inner polymer layer 2 and the outer polymer layer 4 and an intermediary layer 3 sandwiched between aluminum foil 5 and inner polymer layer 2;

wherein:

- inner polymer layer 2 comprises a chromium based protective layer 6 on one side, facing the aluminum foil 5 or intermediary layer 3; and/or
- aluminum foil 5 comprises a chromium based protective layer 6 on one side, facing inner polymer layer 2 or intermediary layer 3; and/or

intermediary polymer layer 3 comprises a chromium based protective layer 6 on at least one of its sides, facing either aluminum foil 5 and/or inner polymer layer 2; and wherein:

the chromium based protective layer 6 is a metallic chromium layer comprising trivalent chromium, or is a trivalent chromium layer;

a modified polyolefin tie layer 8 is deposited between the aluminum foil 5 and polymer layer 2 or between aluminum foil 5 and polymer layer 3 and between polymer layers 2 and 3, wherein at least one of said aluminum foil 5 and one of said polymer layers 2 and 3 comprises protective layer 6; and wherein in use the inner polymer layer 2 is in direct contact with the cell part of the battery;

the outer polymer layer 4 is in contact with a hardware element of the battery.

Preferred embodiments of the present invention disclose one or more of the following features:

the flexible multilayer structure 1 comprises an inner polymer layer 2, an outer polymer layer 4 and an aluminum foil 5 sandwiched between the inner polymer layer 2 and the outer polymer layer 4, wherein:

inner polymer layer 2 comprises a chromium based protective layer 6 on one side, facing the aluminum foil 5; or aluminum foil 5 comprises a chromium based protective layer 6 on one side, facing inner polymer layer 2;

the flexible multilayer structure 1 comprises an inner polymer layer 2, an outer polymer layer 4, an aluminum foil 5 sandwiched between the inner polymer layer 2 and the outer polymer layer 4 and an intermediary layer 3 sandwiched between aluminum foil 5 and inner polymer layer 2, wherein:

inner polymer layer 2 comprises a chromium based protective layer 6 on one side, facing the intermediary polymer layer 3; and/or aluminum foil 5 comprises a chromium based protective layer 6 on one side, facing intermediary polymer layer 3; and/or intermediary polymer layer 3 comprises a chromium based protective layer 6 on at least one of its sides, facing aluminum foil 5 and/or inner polymer layer 2;

the modified polyolefin tie layer 8 is deposited between:

[chromium based protective layer 6 side of the aluminum foil 5 and intermediary polymer layer 3] and [intermediary polymer layer 3 and inner polymer layer 2]; or

[aluminum foil 5 and chromium based protective layer 6 side of intermediary polymer layer 3] and [intermediary polymer layer 3 and inner polymer layer 2]; or

[aluminum foil 5 and intermediary polymer layer 3] and [chromium based protective layer 6 side of intermediary polymer layer 3 and inner polymer layer 2]; or

[aluminum foil 5 and intermediary polymer layer 3] and [chromium based protective layer 6 of inner polymer layer 2 and intermediary polymer layer 3]; or

[aluminum foil 5 and chromium based protective layer 6 side of intermediary polymer layer 3] and [inner polymer layer 2 and chromium based protective layer side 6 of intermediary polymer layer 3]; or

[chromium based protective layer 6 of aluminum foil 5 and intermediary polymer layer 3] and [chromium based protective layer 6 of intermediary polymer layer 3 and inner polymer layer 2]; or

[aluminum foil 5 and chromium based protective layer 6 side of intermediary polymer layer 3] and [intermediary polymer layer 3 and chromium based protective layer 6 side of inner polymer layer 2]; or

[chromium based protective layer 6 side of aluminum foil 5 and intermediary polymer layer 3] and [intermediary polymer layer 3 and chromium based protective layer 6 side of inner polymer layer 2];

the chromium based protective layer 6 comprises between 0.5 and 100% by weight of trivalent chromium and from 0 to 95.5% by weight of metallic chromium, wherein trivalent chromium comprises chromium (III) oxide;

the modified polyolefin tie layer 8 comprises a C2-C8 olefin copolymer comprising one or more monomers selected from the group consisting of maleic anhydride, vinyl acetate, vinyl alcohol, (meth)acrylic acid and alkyl (meth)acrylate;

the modified polyolefin tie layer 8 comprises an anhydride modified polyolefin tie layer 8;

the modified polyolefin tie layer 8 comprises maleic anhydride polyethylene or maleic anhydride polypropylene or a blend thereof;

the modified polyolefin tie layer 8 is characterized by a layer thickness between 1 and 30 μm;

the chromium based protective layer 6 is characterized by a thickness comprised between 1 nm and 5 μm; preferable 1 nm and 150 nm;

the chromium based protective layer 6 is characterized by a thickness comprised between 1 nm and 150 nm;

the inner polymer layer 2 comprises one or more polymer layers selected from the group consisting of polyethylene, polypropylene, cyclic olefin copolymer, poly(vinylalcohol-co-ethylene) and poly(ethylene-co-chlorotrifluoroethylene);

the inner polymer layer 2 is characterized by a thickness comprised between 10 and 100 μm;

the outer polymer layer 4 and the intermediary layer 3 independently comprise one or more layers selected from the group consisting of polyester, polyamide and polyolefin;

the outer polymer layer 4 and the intermediary polymer layer 3 are characterized by a thickness comprised between 4 and 30 μm;

the thickness of aluminum foil 5 is comprised between 6 and 80 μm.

The present invention further discloses a method for the production of the flexible multilayer structure 1 comprising:

providing a primer on one side of aluminum foil (5) facing outer polymer layer (4);

providing chromium based protective layer (6) either on a) the side of aluminum foil (5) facing inner polymer layer (2); and/or b) on at least one side of intermediary polymer layer (3); and/or c) the side of inner polymer layer (2) facing aluminum foil (5);

laminating the primed side of aluminum foil (5) against outer polymer layer (4) and laminating a) and c) or a), b), c) by means of modified olefin tie layer (8).

A preferred embodiment of the method for the production of the multilayer structure 1 discloses the additional feature that the chromium based protective layer 6 is obtained from vapor deposition or from the homogeneous deposition of a liquid coating formulation wherein the liquid phase is selected from the group consisting of water, organic solvent and mixtures thereof.

The present invention further discloses a battery module comprising the battery module packaging, said battery module being a lithium battery module.

Figures 1, 1B:
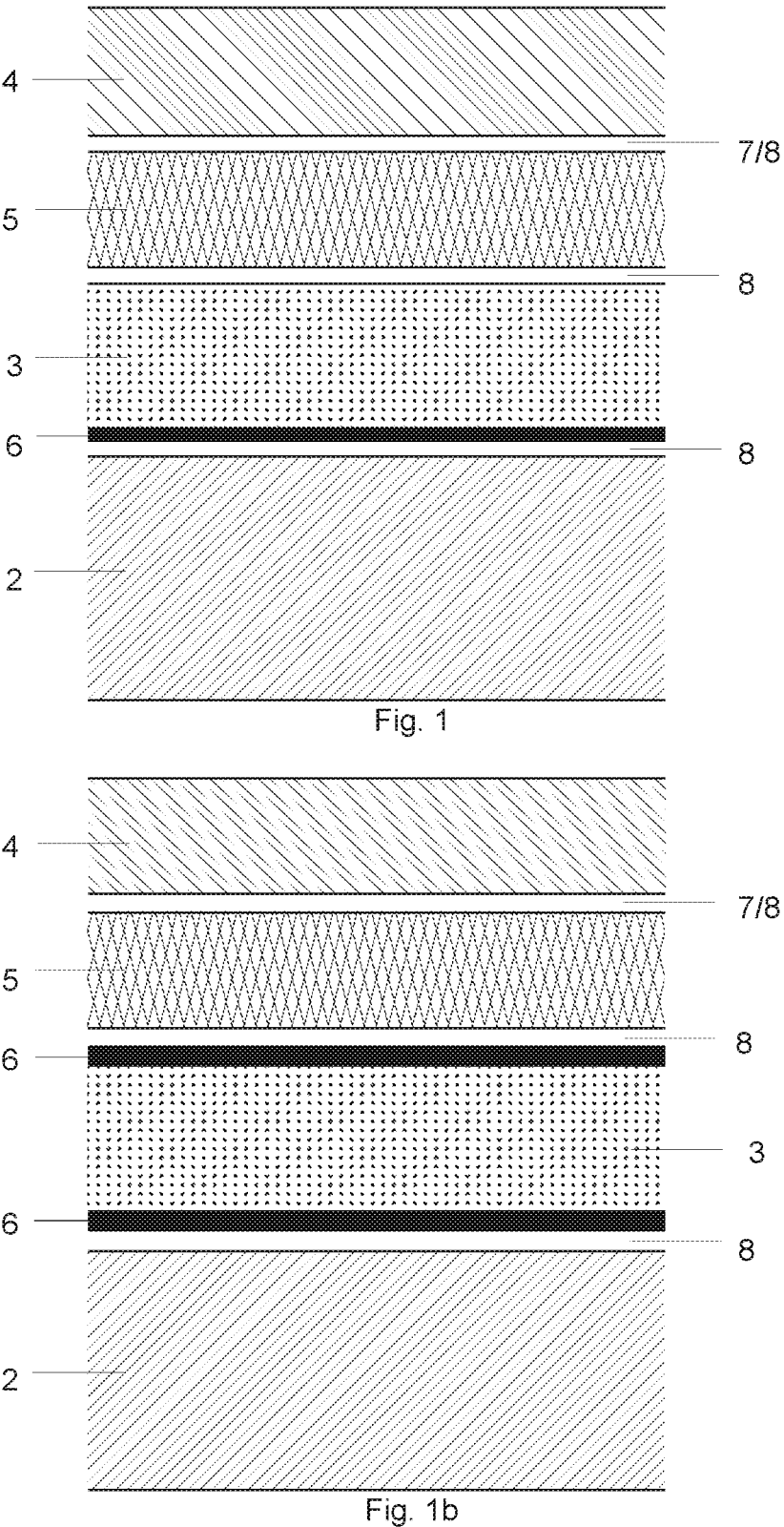
FIG. 1 shows a multilayer structure comprising an intermediary polymer layer, comprising a chromium based protective layer on at least one of its sides.
Figure 2:
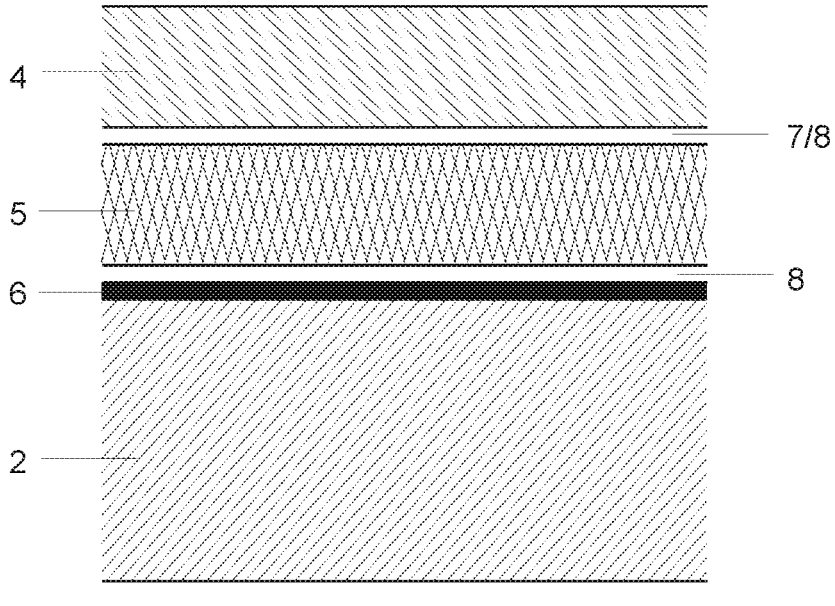
FIG. 2 shows a multilayer structure comprising an inner polymer layer comprising a chromium based protective layer.
Figure 3:
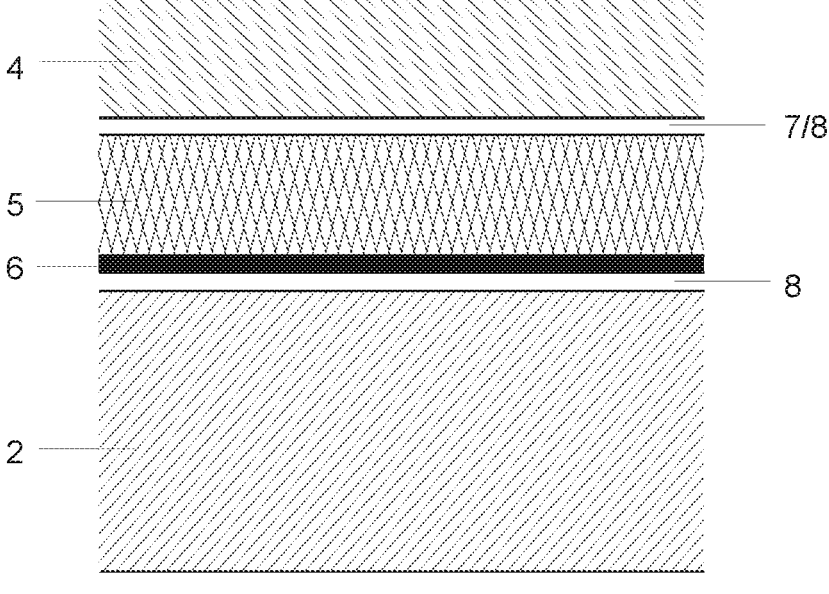
FIG. 3 shows a multilayer structure comprising an aluminum foil comprising a protective chromium based layer.

KEY 1. flexible multilayer structure
2. inner polymer layer
3. intermediary polymer layer
4. outer polymer layer
5. aluminum foil
6. protective layer
7. adhesive or tie layer
8. modified polyolefin tie layer

DETAILED DESCRIPTION OF THE INVENTION

The present invention provides a multilayer film structure, in particular a flexible multilayer film structure for battery encasement, preferably lithium battery encasement, said multilayer film structure completely answering the combination of excellent electrolyte barrier and gas and moisture barrier, particularly gas comprising water vapor, excellent adhesiveness to the electrodes, resistance to high and low temperatures, resistance to the electrolyte solution, resistance to hydrofluoric acid, ease of production and shaping and high seal strength when heat sealed to form the battery module encasement.

The multilayer film structure 1 of the present invention comprises an inner polymer layer 2, an outer polymer layer 4, and an aluminum foil 5 sandwiched between the inner polymer layer 2 and the outer polymer layer, wherein in use,
the inner polymer layer 2 is in direct contact with the cell part of the battery;
the outer polymer layer 4 is in contact with a hardware element of the battery.

The multilayer structure 1 optionally comprises an intermediary polymer layer 3 sandwiched between the aluminum foil 5 and the inner polymer layer 2.

At least one of aluminum foil 5, inner polymer layer 2 and intermediary polymer layer 3 comprises a protective layer 6 wherein:
the protective layer 6 on aluminum foil 5 is facing inner polymer layer 2;
the protective layer 6 on inner polymer layer 2 is facing aluminum foil 5;
the protective layer on at least one side of intermediary polymer layer 3 is facing either aluminum foil 5, or inner polymer layer 2 or both.

Inner polymer layer 2 preferably comprises mono or coextruded layers of polyolefin, selected from the group consisting of polyethylene homopolymer, propylene homopolymer, 1-butylene homopolymer, an ethylene copolymer, a propylene copolymer, a 1-butylene copolymer, cyclic olefin copolymer, and mixtures thereof.

With copolymer the present invention means copolymers of two or more olefin monomers and copolymers of one or more olefin monomers and one or more monomers selected from the group consisting of alkyl (meth)acrylate, vinyl alcohol, vinyl acetate, vinyl halide, vinylidene halide and chlorotrifluoroethylene.

Preferably inner polymer layer 2 comprises an extrusion coated or extrusion laminated combination of a polypropylene homopolymer, polypropylene random copolymer, polypropylene block copolymer, and cast or blown polypropylene.

Intermediary polymer layer 3 and outer polymer layer 4 preferably independently comprise a polyester- and/or a polyamide and/or a polyolefin, wherein:
the polyester is selected from the group consisting of polyethylene terephthalate, diacid modified polyethylene terephthalate, polybutylene terephthalate, polyethylene naphthalate and polybutylene naphthalate and combinations thereof. The diacid of diacid modified polyethylene terephthalate is selected from the group consisting of isophthalic acid, 2,6-naphthalenedicarboxylic acid, 1,4 cyclohexane dicarboxylic acid and mixtures thereof;
the polyamide layer is selected from the group consisting of nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, nylon 12T, nylon MXD6, nylon MXD6/MXDI, nylon 61/6T and combinations thereof;
the polyolefin is selected from the group consisting of. polyethylene homopolymer, propylene homopolymer, 1-butylene homopolymer, an ethylene copolymer, a propylene copolymer, a 1-butylene copolymer, cyclic olefin copolymer, ethylene vinyl alcohol copolymer and combinations thereof.

Preferably intermediary polymer layer 3 and outer polymer layer 4 comprise an oriented polyester and/or an oriented polyamide layer and/or an oriented polyolefin layer.

Intermediary polymer layer 3 and outer polymer layer 4 additionally may comprise one or more additional layers selected from the group consisting of polyimide films such as polyetherimide, polyphenylene films such as polyphenylene sulfide, fluorocarbon films such as ethylene chlorotrifluoroethylene or ethylene-tetrafluoroethylene copolymer and poly(meth)acrylate films such as polymethyl methacrylate.

Aluminum foil 5 and/or intermediary polymer layer 3 and/or inner polymer layer 2 comprise a protective layer 6, wherein:
protective layer 6 on aluminum foil 5 is contacting the side away from outer polymer layer 4, outer polymer layer 4 being in contact with a hardware element of the battery;
protective layer 6 on inner polymer layer 2 is contacting the side away from the side in contact with the cell part of the battery;
protective layer 6 on intermediary polymer layer 3 is contacting one side or both of its sides.

Preferably protective layer 6 is a chromium based protective layer.

By chromium based protective layer 6, the present invention means a metallic chromium layer comprising trivalent chromium or a trivalent chromium layer, wherein trivalent chromium stands for trivalent chromium oxide ($Cr_2O_3$).

In an embodiment, chromium based protective layer 6 is a metallic chromium layer comprising a minor amount of trivalent chromium. By minor amount, the present invention means less than 50% by weight.

Preferably the metallic chromium layer comprises 0.5% by weight or more of trivalent chromium, more preferably 1% by weight or more of trivalent chromium, most preferably 2% by weight or more of trivalent chromium, even 3% by weight or more of trivalent chromium, even 4% by weight or more of trivalent chromium, even 5% by weight or more of trivalent chromium.

The inventors have surprisingly observed that the presence of trivalent chromium oxide in the metallic chromium layer improves the barrier properties against water, gasses, electrolyte and hydrogen fluoride, relative to a 100% metallic chromium layer.

The trivalent chromium may be homogeneously distributed over the entire thickness of the metallic chromium layer, or is present as a separate layer on top of, or into the metallic chromium layer.

In another embodiment, chromium based protective layer 6 is a trivalent chromium layer, in particular a trivalent chromium oxide ($Cr_2O_3$) layer.

Chromium based protective layer 6 can be doped with other metals or metal oxides like, but not limited to iron, nickel, tin, tantalum, boron, aluminum, silicon, titanium, zirconium, vanadium, chromium, manganese, molybdenum, tungsten and the oxides thereof.

Chromium based protective layer 6 may comprise 0.5% by weight or more of doped metals or metal oxides, preferably 1% by weight or more of doped metals or metal oxides, more preferably 2% by weight or more of doped metals or metal oxides, most preferably 3% by weight or more of doped metals or metal oxides, even 4% by weight or more of doped metals or metal oxides, even 5% by weight or more of doped metals or metal oxides.

Chromium based protective layer 6 thus comprises either:
metallic chromium, trivalent chromium, and optionally doped metals and/or metal oxides, wherein the total amount of metallic chromium, trivalent chromium, and doped metals and/or metal oxides, represents 100% by weight, or
trivalent chromium and optionally doped metals and/or metal oxides, wherein the total amount of trivalent chromium, and doped metals and/or metal oxides, represents 100% by weight.

Optionally, chromium based protective layer 6 may be incorporated into the intermediary polymer layer 3 and/or into inner polymer layer.

Chromium based protective layer 6 may be applied via a coating process, such as spray or roller coating, of a solvent based or high solid coating formulation.

Preferably chromium based protective layer 6 is applied by a vapour deposition process.

Preferably aluminum foil 5 has a thickness comprised between 6 and 80 μm, more preferably between 12 and 70 μm, most preferably between 20 and 65 μm.

Preferably outer polymer layer 4 has a thickness comprised between 5 and 40 μm, more preferably between 10 and 30 μm.

Preferably intermediary polymer layer 3 has a thickness comprised between 4 and 40 μm, more preferably between 10 and 30 μm.

Preferably inner polymer layer 2 has a thickness comprised between 10 and 100 μm, more preferably between 20 and 90 μm, most preferably between 25 and 80 um.

Preferably protective layer 6 has a thickness comprised between 1 nm and 5 μm, more preferably between 1 nm and 2 μm. Preferably the vapour deposited protective layer 6 has a thickness comprised between 1 and 150 nm, more preferably between 15 and 110 nm.

Aluminium foil 5 and outer polymer layer 4 are brought together in a multilayer structure by means of adhesive layer or tie layer 7.

Adhesive layer 7 is obtained from an adhesive selected from the group consisting of polyurethanes, acrylics, polyvinyl alcohol, vinyl acetate copolymers, modified polyolefins, polyesters, synthetic or natural rubber, preferably from solvent-based acrylics, one or two component solvent-based or high solids polyurethanes, and radiation-curable adhesives.

Tie layers 7 are selected from the group consisting of polyesters, polyurethanes, polyacrylics and polyolefin (co) polymers.

Aluminium foil 5, inner polymer layer 2 and optionally intermediary polymer layer 3, at least one of them comprising at least one chromium based protective layer 6, are brought together and laminated into flexible multilayer structure 1 by means of modified polyolefin tie layers 8.

The modified polyolefin tie layer 8 preferably comprises an anhydride modified C2-C8 olefin copolymer.

The anhydride modified olefin copolymer preferably is obtained from the copolymerization of
one or more $C_2$-$C_8$-alk-1-enes selected from the group consisting of ethylene, propylene, 1-butene, 1-pentene, 1-hexene, 1-heptene and 1-octene;
maleic anhydride;
optionally one or more monomers selected from the group consisting of vinylacetate, vinylalcohol, (meth)acrylic acid and alkyl (meth)acrylate.

Preferably tie layer 8 is maleic anhydride modified polyethylene or maleic anhydride modified polypropylene.

Preferably tie layer 8 has a thickness comprised between 1 and 30 μm, more preferably between 5 and 15 μm.

The flexible multilayer structure 1 for battery module encasement can be manufactured using methods known in the art.

In an embodiment the flexible multilayer structure 1 is prepared according to a process comprising:
providing a primer on one side of aluminum foil 5;
providing chromium based protective layer 6 on one side of intermediary polymer layer 3;
laminating inner polymer layer 2 against chromium based protective layer 6 of intermediary polymer layer 3;
laminating the primed side of aluminum foil 5 to outer film layer 4;
laminating the free side of intermediary polymer layer 3 against the remaining free side of aluminum foil 5.

In another embodiment the flexible multilayer structure 1 is prepared according to a process comprising:
providing chromium based protective layer 6 on one side of inner polymer layer 2;
providing a primer on one side of aluminum foil 5;
laminating the primed side of aluminum foil 5 to outer polymer layer 4;
laminating chromium based protective layer 6 of inner polymer layer 2 against the remaining free side of aluminum foil 5.

In another embodiment the flexible multilayer structure 1 is prepared according to a process comprising:

providing a chromium based protective layer 6 on both sides of intermediary polymer layer 3;

applying a primer on one side of aluminum foil 5;

laminating the primed side of aluminum foil 5 to outer polymer layer 4;

laminating chromium based protective layer 6 of intermediary polymer layer 3 against the remaining free side of aluminum foil 5;

laminating chromium based protective layer 6 of the intermediary layer 3 against inner polymer layer 2.

In another embodiment the flexible multilayer structure 1 is prepared according to a process comprising:

providing a chromium based protective layer 6 on one side of aluminum foil 5;

applying a primer on the other of aluminum foil 5;

laminating the primed side of aluminum foil 5 to outer polymer layer 4;

laminating chromium based protective layer 6 of aluminum foil 5 against inner polymer layer 2.

Other embodiments for the preparation of flexible multilayer structure 1 comprise obvious modifications of these as disclosed above.

The chromium based protective layer 6 on intermediary polymer layer 3 or on inner polymer layer 2 or on aluminum foil 5 is obtained either from a chromium comprising solvent based or high solid coating formulation, or, and preferably from a vapor deposition technology.

The multilayer structure 1 of the present invention is used for the encasement of battery modules, preferably lithium battery modules, wherein the lithium battery module is a lithium-metal battery module, a lithium ion battery module or a lithium polymer battery module, all comprising as battery component materials an anode, a cathode and an electrolyte; the lithium polymer battery module additionally comprising a separator.

The encasement may be in the form of a pouch or pre-formed packaging.

A battery encasement having the shape of a pouch having one open end can be formed either:

by putting together two battery encasement forming multilayer structures 1 and heat-sealing three edge parts of the superposed structure; or by folding the battery encasement forming multilayer structure sheet 1 in two leaves along a folding line dividing said sheet into two equal halves in contact with each other, and heat sealing the two opposite edges, perpendicular to the folding, so that the bottom part of the pouch is formed by the folding.

Otherwise the multilayer structure 1 may be shaped into a shaped body by hot- and preferably cold forming. The forming may be carried out by deep drawing, stretch-drawing or by a combination of both methods. Such bodies may be in the form of dishes, half-shells or box-shaped containers.

The battery component materials are assembled in the battery encasement, so that the anode and cathode are extended from the inside to the outside, the anode and cathode being hermetically sandwiched when closing the battery encasement by heat sealing.

For heat-sealing the multilayer structure, either inner polymer layer 2 comprises or is a heat sealable layer, or inner polymer layer 2 comprises a heat-sealable resin pattern applied along the edges of the multilayer structure.

10

EXAMPLES

The following illustrative examples are merely meant to exemplify the present invention but they are not intended to limit or otherwise define the scope of the present invention.

Example 1

A multilayer structure 1 was prepared from laminating a 25 μm biaxial oriented polyamide film (BOPA) (outer polymer layer 4) to the primed dull side of a 35 μm aluminum foil 5 by means of a 15 μm anhydride modified polypropylene tie layer 8. The free side of aluminum foil 5 was laminated to a 20 μm oriented polyethylene terephthalate film (intermediary polymer layer 3) by means of a 15 μm anhydride modified polypropylene tie layer 8, said oriented polyethylene terephthalate film comprising a 30 nm vapour deposited trivalent chromium oxide layer (protective layer 6) on both of its sides. The resulting layer stack (outer polymer layer 4/tie layer 8/aluminum foil 5/tie layer 8/protective layer 6/intermediary polymer layer 3/protective layer 6) is laminated by means of 15 μm anhydride modified polypropylene tie layer 8 to a 60 μm coextruded combination of polypropylene homopolymer, polypropylene random copolymer and cast polypropylene (inner polymer layer 2).

Example 2

A multilayer structure 1 was prepared from laminating a 25 μm biaxial oriented polyamide film (BOPA) (outer polymer layer 4) to the primed dull side of a 35 μm aluminum foil 5 by means of a 15 μm anhydride modified polypropylene tie layer 8. The free side of aluminum foil 5, provided with a 20 nm vapor deposited chromium layer, comprising 3% by weight of trivalent chromium oxide (protective layer 6), was laminated to a 60 μm coextruded combination of polypropylene homopolymer, polypropylene random copolymer and cast polypropylene (inner polymer layer 2) by means of a 15 μm anhydride modified polypropylene tie layer 8.

Example 3

A multilayer structure 1 was prepared from laminating a 25 μm biaxial oriented polyamide film (BOPA) (outer polymer layer 4) to the primed dull side of a 35 μm aluminum foil 5 by means of a 15 μm anhydride modified polypropylene tie layer 8. The free side of aluminum foil 5, was laminated, by means of a 15 μm anhydride modified polypropylene tie layer 8, to the 40 nm trivalent chromium oxide layer, vapor deposited on one side of a 60 μm coextruded combination of polypropylene homopolymer, polypropylene random copolymer and cast polypropylene (inner polymer layer 2).

Flexible multilayer structure 1 of the examples 1 to 3 were tested for bond strength between the respective layers; seal strength between heat sealed inner film layers 2 and corrosion resistance versus electrolyte.

Example 4

Bond strength was determined using a Hounsfield H5KS tensile tester. Measurements were done on 15 mm width samples using a pull angle of 90°, a pull direction in the cross direction of the multilayer film, a pull velocity of 100 mm/min and a load cell of 1000 N.

A bond strength of more than 5 N/15 mm was measured for the bonding between outer film 4 and aluminum foil 5. For the combination (aluminum foil 5 laminated to intermediary polymer layer 3) and (intermediary polymer layer 3 laminated to inner polymer layer 2), of example 1 and for the combination (aluminum foil 5 laminated to inner polymer layer 2), of example 2 and example 3, the bond strength was not measurable; no delamination was observed.

For multilayer structure 1 heat sealed to multilayer structure 1 via inner polymer layer 2, using the KOPP SGPE20 sealing equipment with 2 heated seal bars, with a 3 sec seal time and a pressure of 600 N/20 cm², a seal strength of more than 30 N/15 mm was measured using a Hounsfield H5KS tensile tester for the multilayer structures 1 of the examples 1 to 3. Seal strength measurements were done on 15 mm width samples using a pull angle of 90°, a pull direction across the seal, a pull velocity of 300 mm/min and a load cell of 1000 N.

Corrosion resistance was measured by soaking the multilayer structure 1 of the examples 1 to 3, in a LiPF6 electrolyte for 5 months. No delamination, corrosion or any other negative changes were observed.

The multilayer structure 1 of the examples 1 to 3, was transformed into a pouch through patterned heat sealing. The pouch then was filled with LiPF6 comprising 4% of water and exposed in an oven at 60° C. for 4 weeks. No corrosion or seal integrity loss was observed.

Example 5

The flexible multilayer film 1 of the examples 1 to 3, transformed into a pouch, was used for the manufacturing of battery modules with:

a lithium-nickel-manganese-cobalt-oxide cathode (NMC 622) (3.5 mAh/cm²)
a graphite anode (3.8 mAh/cm²)
a Celgard 2500, 25 μm polypropylene separator and
a LP30+2% VC electrolyte (LP30: 1M LiPF6 in ethylene carbonate/dimethyl carbonate 1/1 and VC: vinylenecarbonate).

Example 6

The battery modules of example 5, based on multilayer structure of the examples 1 to 3, each were tested for capacity fading and post mortem analysis.

Cycling charge-discharge tests at 23° C. and 45° C. and post-mortem analysis have been carried out to investigate any damages or changes. No difference was observed between the battery modules of example 5, based on multilayer structure of the examples 1 to 3, and the market references.

Further the flexible multilayer structure 1 allows for the efficient production of battery pouches in a very economical and environmentally friendly way.

No hexavalent chromium is involved for creating a protection layer and a lower thickness of the aluminum foil allows for an overall weight-, cost and carbon footprint reduction versus prior art systems.

The invention claimed is:

1. Battery module packaging comprising a flexible multilayer structure said structure comprising:

an inner polymer layer, an outer polymer layer and an aluminum foil sandwiched between the inner polymer layer and the outer polymer layer, or an inner polymer layer, an outer polymer layer, and an aluminum foil sandwiched between the inner polymer layer and the outer polymer layer and an intermediary polymer layer sandwiched between aluminum foil and the inner polymer layer wherein:
inner polymer layer comprises a chromium based protective layer on one side, facing the aluminum foil or intermediary polymer layer; and/or
the aluminum foil comprises a chromium based protective layer on one side, facing the inner polymer layer or the intermediary polymer layer; and/or
the intermediary polymer layer comprises a chromium based protective layer on at least one of its sides, facing either the aluminum foil and/or the inner polymer layer; and wherein:
the chromium based protective layer is a metallic chromium layer comprising trivalent chromium, wherein the metallic chromium layer comprises 0.5% by weight to less than 50 by weight of trivalent chromium;
a modified polyolefin tie layer is deposited between the aluminum foil and the inner polymer layer or between the aluminum foil and the intermediary polymer layer and between the inner and intermediary polymer layers and, wherein at least one of said aluminum foil and one of said inner and intermediary polymer layers comprises the chromium based protective layer; and wherein in use
the inner polymer layer is in direct contact with a cell part of a battery; and
the outer polymer layer is in contact with a hardware element of the battery.

2. The battery module packaging according to claim 1 wherein flexible multilayer structure comprises an inner polymer layer, an outer polymer layer and an aluminum foil sandwiched between the inner polymer layer and the outer polymer layer, wherein:
inner polymer layer comprises a chromium based protective layer on one side, facing the aluminum foil; or
aluminum foil comprises a chromium based protective layer on one side, facing inner polymer layer.

3. The battery module packaging according to claim 1 wherein flexible multilayer structure comprises an inner polymer layer, an outer polymer layer, an aluminum foil sandwiched between the inner polymer layer and the outer polymer layer and an intermediary polymer layer sandwiched between aluminum foil and inner polymer layer, wherein:
inner polymer layer comprises a chromium based protective layer on one side, facing the intermediary polymer layer; and/or
aluminum foil comprises a chromium based protective layer on one side, facing intermediary polymer layer; and/or
intermediary polymer layer comprises a chromium based protective layer on at least one of its sides, facing aluminum foil and/or inner polymer layer.

4. The battery module packaging according to claim 1 wherein a modified polyolefin tie layer of flexible multilayer structure is deposited between:
[chromium based protective layer side of the aluminum foil and intermediary polymer layer] and [intermediary polymer layer and inner polymer layer]; or
[aluminum foil and chromium based protective layer side of intermediary polymer layer] and [intermediary polymer layer and inner polymer layer]; or
[aluminum foil and intermediary polymer layer] and [chromium based protective layer side of intermediary polymer layer and inner polymer layer]; or

[aluminum foil and intermediary polymer layer] and [chromium based protective layer of inner polymer layer and intermediary polymer layer]; or

[aluminum foil and chromium based protective layer side of intermediary polymer layer] and [inner polymer layer and chromium based protective layer side of intermediary polymer layer]; or

[chromium based protective layer of aluminum foil and intermediary polymer layer] and [chromium based protective layer of intermediary polymer layer and inner polymer layer]; or

[aluminum foil and chromium based protective layer side of intermediary polymer layer] and [intermediary polymer layer and chromium based protective layer side of inner polymer layer]; or

[chromium based protective layer side of aluminum foil and intermediary polymer layer] and [intermediary polymer layer and chromium based protective layer side of inner polymer layer];

of flexible multilayer structure.

5. The battery module packaging according to claim 1, wherein modified polyolefin tie layer of flexible multilayer structure comprises a C2-C8 olefin copolymer comprising one or more monomers selected from the group consisting of maleic anhydride, vinyl acetate, vinyl alcohol, (meth)acrylic acid and alkyl (meth)acrylate.

6. The battery module packaging according to claim 1, wherein modified polyolefin tie layer of flexible multilayer structure comprises an anhydride modified polyolefin tie layer.

7. The battery module packaging according to claim 1, wherein modified polyolefin tie layer of flexible multilayer structure comprises maleic anhydride polyethylene or maleic anhydride polypropylene or a blend thereof.

8. The battery module packaging according to claim 1, wherein modified polyolefin tie layer of flexible multilayer structure is characterized by a layer thickness between 1 and 30 μm.

9. The battery module packaging according to claim 1, wherein the chromium based protective layer of flexible multilayer structure is characterized by a thickness comprised between 1 nm and 5 μm.

10. The battery module packaging according to claim 9 wherein the chromium based protective layer of flexible multilayer structure is characterized by a thickness comprised between 1 nm and 150 nm.

11. The battery module packaging according to claim 1, wherein the inner polymer layer of the flexible multilayer structure comprises one or more polymer layers selected from the group consisting of polyethylene, polypropylene, cyclic olefin copolymer, poly(vinylalcohol-co-ethylene) and poly(ethylene-co-chlorotrifluoro-ethylene).

12. The battery module packaging according to claim 1, wherein the inner polymer layer of the flexible multilayer structure is characterized by a thickness comprised between 10 and 100 μm.

13. The battery module packaging according to claim 1, wherein the outer polymer layer and the intermediary layer of the flexible multilayer structure independently comprise one or more layers selected from the group consisting of polyester, polyamide and polyolefin.

14. The battery module packaging according to claim 1, wherein the outer polymer layer and the intermediary polymer layer of the flexible multilayer structure are characterized by a thickness comprised between 4 and 30 μm.

15. The battery module packaging according to claim 1 wherein the thickness of aluminum foil of the multilayer structure is comprised between 6 and 80 μm.

16. Battery module comprising the battery module packaging according to claim 1, being a lithium battery module.

* * * * *